United States Patent
Yoshi et al.

(10) Patent No.: US 9,421,589 B2
(45) Date of Patent: Aug. 23, 2016

(54) SOIL CLEANING METHOD

(75) Inventors: Shunsuke Yoshi, Tokyo (JP); Masaru Tomoguchi, Tokyo (JP)

(73) Assignee: DOWA ECO-SYSTEM CO., LTD., Tokyo (JP)

(*) Notice: Subject to any disclaimer, the term of this patent is extended or adjusted under 35 U.S.C. 154(b) by 0 days.

(21) Appl. No.: 13/810,044

(22) PCT Filed: Jul. 15, 2010

(86) PCT No.: PCT/JP2010/061959
§ 371 (c)(1),
(2), (4) Date: Jan. 14, 2013

(87) PCT Pub. No.: WO2012/008032
PCT Pub. Date: Jan. 19, 2012

(65) Prior Publication Data
US 2013/0115004 A1   May 9, 2013

(51) Int. Cl.
*B03C 1/005* (2006.01)
*B09C 1/00* (2006.01)
*B03C 1/01* (2006.01)
(Continued)

(52) U.S. Cl.
CPC .............. *B09C 1/00* (2013.01); *B03C 1/005* (2013.01); *B03C 1/01* (2013.01); *B03C 1/30* (2013.01); *B07B 15/00* (2013.01); *B09C 1/02* (2013.01); *B03C 2201/20* (2013.01)

(58) Field of Classification Search
CPC ..... B03C 1/005; B03C 1/01; B03C 2201/20; B09C 1/00; B09C 1/02
USPC .......... 209/3, 10, 214, 216; 241/24.11, 24.14
See application file for complete search history.

(56) References Cited

U.S. PATENT DOCUMENTS 5,342,449 A * 8/1994 Holbein et al. ................. 134/2
6,120,579 A * 9/2000 El-Shoubary et al. ........ 75/742
(Continued)

FOREIGN PATENT DOCUMENTS

| CN | 1103254 C | 3/2003 |
|---|---|---|
| CN | 1689721 A | 11/2005 |

(Continued)

OTHER PUBLICATIONS

International Search Report, mailed Aug. 10, 2010, PCT/JP2010/061959.

(Continued)

*Primary Examiner* — Joseph C Rodriguez
(74) *Attorney, Agent, or Firm* — Michael, Best & Friedrich LLP

(57) ABSTRACT

The present invention provides a soil cleaning method. The soil cleaning method is characterized in that after a pre-treatment step of mixing a dehydrating agent in soil to reduce a water content of the soil to 10 mass % or less is performed, a magnetic separation step of feeding the soil whose water content is reduced to 10 mass % or less in the pre-treatment step, to a dry magnetic separator to separate and remove a contaminant in coarse soil as magnetically attracted matter is performed. By bringing the soil into a dry state to separate the soil into magnetically attracted matter and magnetically unattracted matter and collecting the heavily contaminated magnetically attracted matter, it is possible to facilitate separating fine soil from contaminated soil, which makes it possible to easily reduce the content of the contaminant in the coarse soil.

7 Claims, 3 Drawing Sheets

(51) Int. Cl.
*B03C 1/30* (2006.01)
*B07B 15/00* (2006.01)
*B09C 1/02* (2006.01)

(56) References Cited

U.S. PATENT DOCUMENTS 7,255,514 B2 * 8/2007 Benjamin et al. ......... 405/128.75
8,695,903 B2 * 4/2014 Gillis .......................... 241/24.14

FOREIGN PATENT DOCUMENTS

| CN | 101430260 A | 5/2009 |
|---|---|---|
| JP | 10-071387 A | 3/1998 |
| JP | 2003-103248 A | 4/2003 |
| JP | 2003-340423 A | 12/2003 |
| JP | 2004-141774 A | 5/2004 |
| JP | 2004-347141 A | 12/2004 |
| JP | 2005-152739 A | 6/2005 |
| JP | 2008272539 A | 11/2008 |
| JP | 2008-289963 A | 12/2008 |
| TW | 200827623 A | 7/2008 |

OTHER PUBLICATIONS

Office Action issued in Chinese Application No. 099123705, dated Sep. 25, 2014.
Office Action issued in Japanese Application No. 2012-524374, dated May 26, 2015.
Office Action issued in Taiwan Application No. 99123705, dated Jun. 5, 2015.

* cited by examiner

SOIL CLEANING METHOD

TECHNICAL FIELD

The present invention relates to a method of cleaning soil contaminated by heavy metals, oil, and the like.

BACKGROUND ART

In an art to clean contaminated soil, an easy and inexpensive method is desired in view of industrially implementing it. As a conventional art, one of methods to clean soil contaminated by heavy metals, oil, and the like is a soil washing method. This method utilizes a characteristic that in contaminated soil, a larger amount of the contaminant adheres to soil particles having a smaller particle size, and it is a method to turn the contaminated soil into slurry by using a large amount of water and perform wet classification to remove fine products. This method, however, has a problem that loads of a disposal step of contaminated water produced when the soil is turned into the slurry and a dehydration step of treatment residues are large. Another problem is that, when the content of the contaminants in the contaminated soil is high, it is not possible to remove the contaminants except large gravel to produce clean soil.

Therefore, in recent years, there has been proposed a method in which a small amount of quicklime is mixed in contaminated soil, a wet granular lump is contained in the soil that is to be treated, and a classifying means and a means for crushing the granular lump are combined to remove a clay fraction from the soil (Patent Document 1). Further, as a means for obtaining clean soil from heavily contaminated soil, there have been proposed a method to feed contaminated soil to a magnetic separator to collect contaminants in the soil as magnetically attracted matter and a method to separate and remove contaminants by combining an ore flotation method with the soil washing method (Patent Documents 2, 3).

[Patent Document 1] Japanese Patent Application Laid-open No. 2008-289963
[Patent Document 2] Japanese Patent Application Laid-open No. 10-71387
[Patent Document 3] Japanese Patent Application Laid-open No. 2003-103248

DISCLOSURE OF THE INVENTION

Problems to Be Solved by the Invention

However, in the above-described methods, gravel and soil can be separated, but since fine particles form the wet clay lump, it is difficult to classify soil class into sand and clay, and they are methods not applicable depending on the nature of soil being a treatment target. When the water content of the soil is high, separation accuracy of the contaminants by the dry magnetic separator greatly lowers in terms of soil classification. Further, when the ore flotation method is used, not only complicated process management is required but also large soil-milling equipment and a specialized flotation machine are required in addition to soil washing equipment, leading to a great increase in construction cost.

The present invention was made in view of the above problems and has an object to obtain a larger amount of clean soil by performing a magnetic separation step after reducing the water content of contaminated soil to a certain degree, to facilitate separating fine soil from the contaminated soil.

Means for Solving the Problems

To attain the aforesaid object, according to the present invention, there is provided a soil cleaning method, wherein, after "a pre-treatment step" of mixing a dehydrating agent in soil to reduce a water content of the soil to 10 mass % or less is performed, "a magnetic separation step" of feeding the soil whose water content is reduced to 10 mass % or less in the pre-treatment step, to a dry magnetic separator to separate and remove a contaminant in coarse soil as magnetically attracted matter is performed. Gravel and coarse soil picked up in the magnetic separation step and separated as magnetically unattracted matter can be handled as clean soil.

One of the soil having undergone the pre-treatment step and the soil having undergone the magnetic separation step may be subjected to a dry milling process. Further, one of the soil having undergone the pre-treatment step and the soil having undergone the magnetic separation step may be subjected to a gravity concentration process. Further, the magnetic separation step may be performed in a plurality of of magnetic separation steps, a magnet with a higher magnetic force being used in the magnetic separation step performed later, and the later magnetic separation step being applied to magnetically unattracted matter separated in the previous magnetic separation step. Incidentally, as the dehydrating agent, one of quicklime, gypsum, and cement can be used.

Effect of the Invention

According to the soil cleaning method of the present invention, the soil is brought into a dry state and is separated into the magnetically attracted matter and the magnetically unattracted matter, and the heavily contaminated magnetically attracted matter is collected, thereby facilitating the separation of fine soil from the contaminated soil to make it possible to easily reduce the content of the contaminant in the coarse soil. Further, most of the fine soil can be collected in the classifying step, and therefore, even when wet classification is performed thereafter as required, it is possible to greatly alleviate a load of water disposal and a load of a dehydration process of residues of the fine soil.

MODE FOR CARRYING OUT THE INVENTION

Figure 1:
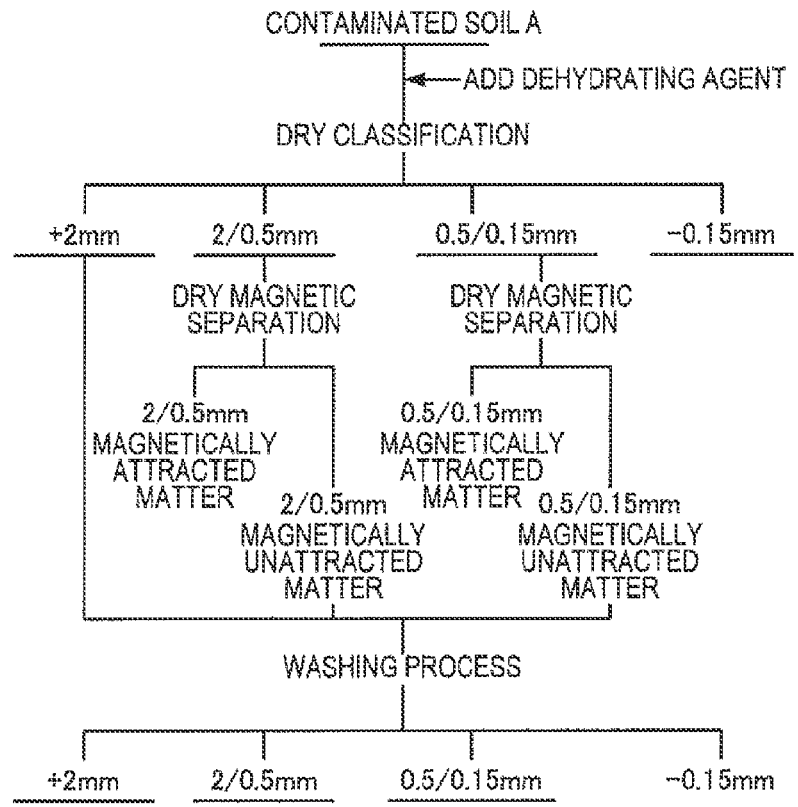
[FIG. 1] is an explanatory process chart of an example 1.

Hereinafter, an embodiment of the present invention will be described. A soil cleaning method according to the present invention has a pre-treatment step and a magnetic separation step which will be described below. The soil cleaning method according to the present invention may further have one of a washing step, a milling step, and a gravity concentration step which will be described below. A target of the soil cleaning method according to the present invention is soil contaminated by heavy metals such as lead or chromium, oil, and so on. Further, the soil cleaning method according to the present invention is carried out to excavated contaminated soil, for instance, and a place where the method is carried out may be any. Further, all of gravel and coarse soil obtained by the soil cleaning method according to the present invention or part of the gravel and the coarse soil obtained by the soil cleaning method according to the present invention can be reused for cover materials and the like as clean soil. Further, fine soil separated when a classification step is performed and a dehydrated cake produced when the washing step is performed are recycled as cement or the like or are finally disposed of However, a method of using these products is not limited to those written here.

(Pre-Treatment Step)

First, the pre-treatment step of mixing a dehydrating agent in soil contaminated by heavy metals such as lead and chromium, oil, and so on to dry the soil is performed. Examples of a method of mixing the dehydrating agent are a method using an ordinary soil improving machine for the mixture, a method using a chemical mixing plant for the mixture, and so on, and its means may be any. The soil dried in the pre-treatment step comes to have a 10 mass % water content or less. Preferably, the water content is over 0 (zero) and 5 mass % or less. Note that the water content can be calculated by a method conforming to JIS A1203 "Testing Method for Water Content of Soils", that is, by measuring a weight of the soil in a natural state and a weight of the soil dried in a drying furnace (110±5° C.).

The dehydrating agent added in the pre-treatment step may be any, provided that it has a property to cause at least one of a dehydration reaction, a water absorption reaction, and a heat generation reaction in accordance with the mixture with the soil, and examples thereof are gypsum, cement, quicklime, and the like, but an ordinary dehydrating agent is usable regardless of its kind. A preferable dehydrating agent is quicklime. Incidentally, an amount of the dehydrating agent that is to be added in the pre-treatment process is 5 to 25% (preferably 10 to 20%) of the soil in weight ratio. Using quicklime as the dehydrating agent makes it possible to suitably treat multiply contaminated soil containing both or one of oil and VOC, a cyan compound, and heavy metals. Further, the use of quicklime as the dehydrating agent makes it possible to suitably treat oil-contaminated soil. Further, in the pre-treatment step, only the treatment within two hours suffices for the dehydration.

(Magnetic Separation Step)

The magnetic separation step is intended to separate and remove the contaminant in the soil dried in the above-described pre-treatment step, as magnetically attracted matter. In the magnetic separation step, the soil dried in the pre-treatment step is fed to a dry magnetic separator, and the contaminant in coarse soil is mainly separated and removed as the magnetically attracted matter. Examples of the dry magnetic separator are a drum-type dry magnetic separator, a suspension-type magnetic separator, and the like, and the drum-type dry magnetic separator is preferable. Intensity of a magnet used in the dry magnetic separator is 100 to 20,000 gausses. Preferably, the intensity is 500 to 10,000 gausses.

The magnetic separation step only needs to be carried out to the soil dried by the above-described pre-treatment step, and a separation form, the number of times the separation is performed, and its timing in the magnetic separation may be any, but preferably, magnetically attracted matter having a high magnetism is separated and removed by a magnetic separator with a low magnetic force first, and thereafter, magnetically attracted matter having a low magnetism is separated and removed by a magnetic separator with a high magnetic force.

The magnetic separation step may be performed in a plurality of magnetic separation steps. In this case, the magnetic separation step performed later uses a magnet with a higher magnetic force, and the later magnetic separation step is performed to the magnetically unattracted matter separated in the previous magnetic separation step.

(Classification Step)

Dry classification can be appropriately carried out to the soil dried in the above-described pre-treatment step or further the soil from which the contaminant is separated and removed as the magnetically attracted matter by the above-described magnetic separation step. This dry classification can classify the soil into gravel, coarse soil, and fine soil. A classification form, the number of times the classification is performed, and its timing in this classification step may be any. For the classification, an ordinary classifier is used, and its examples can be a wind-powered classifier, a vibrating sieve, a dry cyclone classifier, a vibrating screen, and the like. Further, a plurality of classifiers may be combined. Classification points in this classification step are between 38 µm to 50 mm, and under the condition that three final products or more including the gravel, the coarse soil, and the fine soil are obtained, the number of the classification points is 2 or more to less than 15. Preferably, the classification point of the gravel and the coarse soil is 2 to 40 mm, and the classification point of the coarse soil and the fine soil is 250 µm to 38 µm. More preferably, the classification point of the gravel and the coarse soil is 2 to 5 mm, and the classification point of the coarse soil and the fine soil is 75 µm to 150 µm, and subsequently, the coarse soil is classified with the classification point being 1 mm to 300 µm, whereby two kinds of coarse soils is obtained.

(Washing Process)

The washing process is carried out to all of or part of the gravel or of the gravel and the coarse soil obtained after the above-described classification step. A process form and the timing of the washing process may be any. Washing equipment is composed of ordinary mud dissolving equipment for soil such as a rod scrubber, ordinary classification equipment such as a cyclone, ordinary soil dehydrating equipment such as a vibrating screen, ordinary water treatment equipment such as a thickener, and sludge dehydrating equipment such as a filter press, and the combination of pieces of the equipment may be any. Further, in this washing process, ordinary milling equipment such as a ball mill and ordinary flotation equipment can be provided.

Incidentally, a water washing process may be carried out to the gravel obtained after the classification step. Further, the washing process is applied to all of the coarse soil or the coarse soil in a predetermined particle size class, depending on the nature of the soil, thereby collecting the coarse soil again, and the coarse soil in combination with the water-washed gravel is handled as clean soil.

(Milling Process)

In the milling process, a milling form thereof, the number of times the milling process is performed, and its timing may be any, provided that the milling process is carried out to the soil dried in the above-described pre-treatment step. Examples of its milling means as an ordinary milling machine are a ball mill, a rod mill, a cyclone mill, a rotation-type centrifugal cake crusher, and the like. Other apparatuses and methods from which a milling effect can be expected can be similarly used.

As for a milled state of particles in the milling process, an exfoliation effect of the fine soil adhering to the gravel and particle surfaces of the coarse soil, or a surface polishing effect of the coarse soil, and further a crushing effect are expected, and a milling degree may be any. Incidentally, milling ability is decided based on the nature of contaminated soil being a treatment target. Fine particles are removed from a product of the milling process by a dry classifier, and the product combined with the gravel having undergone the water washing process can be collected as cleaned soil.

(Gravity Concentration Process)

In the gravity concentration process, its gravity concentration form, the number of times the gravity concentration is performed, and its timing may be any, provided that it is carried out to the coarse soil whose size is aligned in the above-described classification step. Examples of its gravity concentration means as an ordinary gravity concentrator are a wind-powered separator, a dry gravity concentrator, an air-screen separator, and the like. A high-specific-gravity product obtained here is handled as a contaminated concentrate and can be separated and removed.

The fine soil separated when the classification step is performed, the magnetically attracted matter separated in the above-described magnetic separation step, and the high-specific-gravity product obtained in the above-described gravity concentration step are carried to a cement factory to be reused as cement raw materials, or are carried to a soil cleaning facility, are subjected to detoxication, and are carried to a final disposal site to be landfilled. Among the final products produced in the above-described process steps, the gravel is reused as a cover material. The coarse soil is all reused as clean soil for the cover material after the contaminant concentration therein is confirmed, or part thereof is reused in the same manner only when the classification has been further carried out to the coarse soil. Incidentally, when the contaminant concentration is over a designated level, re-treatment is carried out or the coarse soil is handled similarly to the fine soil.

EXAMPLES

In soil A contaminated by lead (lead content 228 mg/kg), 12 mass % quicklime in soil weight ratio was mixed as a dehydrating agent as shown in FIG. 1, and the mixture was left standing for one hour at room temperature for curing. The water content after the curing became 7.2 mass % and the soil became dry, while the water content before the curing was 12.0 mass % (according to JIS A1203 "Testing Method for Water Content of Soils". The same applies to the below). Dry classification was carried out to this soil by using sieves with 2 mm, 0.5 mm, and 0.15 mm openings, thereby classifying the soil into soil in a particle size class of 2 mm or more (gravel), soil in a particle size class of less than 2 mm to 0.5 mm (coarse soil), soil in a particle size class of less than 0.5 mm to 0.15 mm (coarse soil), and soil in a particle size class of less than 0.15 mm (fine soil), and ratios of the soils in the respective particle size classes and their lead contents were measured. The ratio of the soil in the particle size class of 2 mm or more (gravel) was 48.2 mass % (lead content 0 mg/kg), the ratio of the soil in the particle size class of less than 2 mm to 0.5 mm (coarse soil) was 23.2 mass % (lead content 224 mg/kg), the ratio of the soil in the particle size class of less than 0.5 mm to 0.15 mm (coarse soil) was 12.5 mass % (lead content 266 mg/kg), and the ratio of the soil in the particle size class of less than 0.15 mm (fine soil) was 16.1 mass % (lead content 205 mg/kg). Note that in the examples of this specification, soil with less than 2 mm is a target and a collection and removal ratio of the soil excluding 2 mm gravel or larger is found, according to Notification No. 19 of Ministry of the Environment.

Thereafter, dry magnetic separation was carried out to the soils in the particle size classes of less than 2 mm to 0.5 mm and less than 0.5 mm to 0.15 mm (coarse soils) by using a 7000 gauss magnet. This dry magnetic separation separated the soil with less than 2 mm to 0 5 mm (coarse soil) into 3.2 mass % (lead content 733 mg/kg) magnetically attracted matter and 20.0 mass % (lead content 141 mg/kg) magnetically unattracted matter. Further, the soil in the particle size class of less than 0.5 mm to 0.15 mm (coarse soil) was separated into 1.4 mass % (lead content 569 mg/kg) magnetically attracted matter and 11.1 mass % (lead content 229 mg/kg) magnetically unattracted matter.

Further, the magnetically unattracted matter after the dry magnetic separation and the soil in the particle size class of 2 mm or more (gravel) obtained in the above-described dry classification were turned into slurry by using 1 L water, and wet classification (washing process) was carried out by using sieves with 2 mm, 0.5 mm, and 0.15 mm openings. After products of the classification were dried, ratios and lead contents of the soils in the respective particle size classes were measured. As a result, the ratio of the soil in the particle size class of 2 mm or more (gravel) was 46.6 mass % (lead content 0 mg/kg), the soil in the particle size class of less than 2 mm to 0.5 mm (coarse soil) was 15.5 mass % (lead content 99 mg/kg), the ratio of the soil in the particle size class of less than 0.5 mm to 0.15 mm (coarse soil) was 8.6 mass % (lead content 144 mg/kg), and the ratio of the soil in the particle size class of less than 0.15 mm (fine soil) was 8.6 mass % (lead content 304 mg/kg).

From the results of the example 1, it has been confirmed that mixing the dehydrating agent (quicklime) in the soil A to bring the soil A into the dry state makes it possible to separate the soil A into the gravel (particle size class of 2 mm or more), the coarse soil (particle size class of less than 2 mm to 0.15 mm), and the fine soil (particle size class of less than 0.15 mm) by the dry classification. It has been further confirmed that by the dry classification process, it is possible to collect and remove 65 mass % of the whole fine soil originally contained in the soil A. Note that, strictly speaking, fine soil adheres also to the magnetically attracted matter separated by the magnetic separation, but its ratio to the whole is small, and therefore, it was handled as being within a range of error. Further, the dehydrating agent was added before the dry classification, and a weight after the addition was defined as 100%. "The collection ratio of the fine soil by the dry classification" was found in the following manner.

"collection ratio of fine soil by dry classification" =
(weight fraction of fine product obtained by dry classsification) /
(weight fraction of fine product) =
(weight fraction of fine product obtained by dry classification) /
((weight fraction of fine product obtained by dry classification) + (weight fraction of fine product obtained by wet classification)) = 16.1 / (16.1 + 8.6) = 0.652

When the gravel and the coarse soil are subjected to the washing process as in the example 1, it is possible to expect the alleviation of the load of the water disposal. Further, it has been confirmed that employing the dry magnetic separation to the coarse soil makes it possible to separate and collect the lead-containing particles efficiently. The effect of separating the contaminant is especially large for the soil in the particle size class of less than 2 mm to 0.5 mm, and an excellent feature not available in a conventional soil washing method has been confirmed.

Example 2

Figure 2:
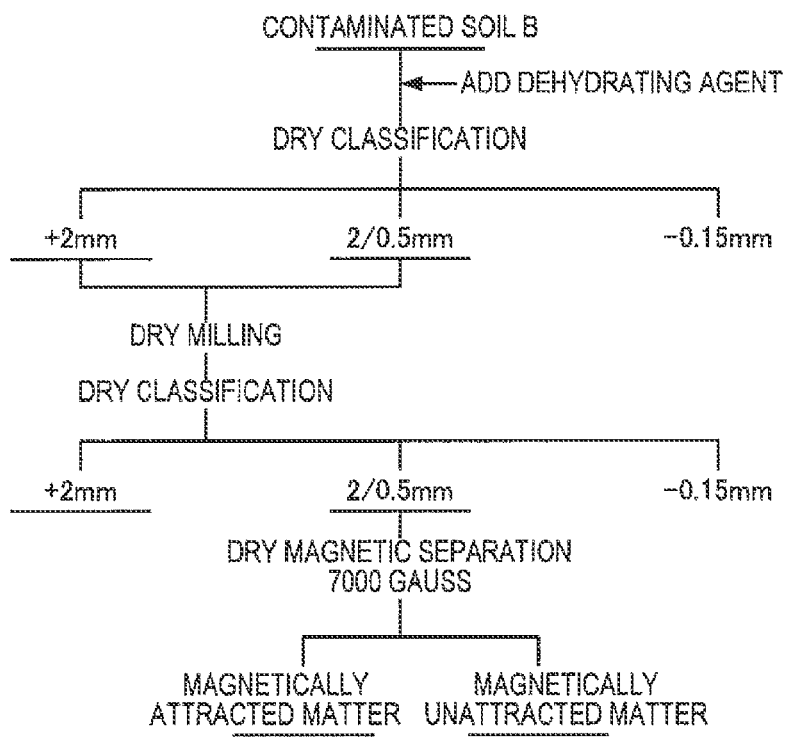
[FIG. 2] is an explanatory process chart of an example 2.

In soil B contaminated by lead (lead content 417 mg/kg), 15 mass % quicklime in soil weight ratio was mixed as a dehydrating agent as shown in FIG. 2, and the mixture was left standing for one hour at room temperature for curing. The water content after the curing became 9.2 mass % and the soil became dry, while the water content before the curing was 15.0 mass %. Dry classification was carried out to this soil by using sieves with 2 mm and 0.15 mm openings, thereby classifying the soil into soil in a particle size class of 2 mm or more (gravel), soil in a particle size class of less than 2 mm to 0. 15 mm (coarse soil), and soil in a particle size class of less than 0.15 mm (fine soil), and ratios of the soils in the respective particle size classes and their lead contents were measured. The ratio of the soil in the particle size class of 2 mm or more (gravel) was 55.0 mass % (lead content 0 mg/kg), the ratio of the soil in the particle size class of less than 2 mm to 0.15 mm (coarse soil) was 28.0 mass % (lead content 423 mg/kg), and the ratio of the soil in the particle size class of less than 0.15 mm (fine soil) was 17.0 mass % (lead content 408 mg/kg).

Next, the soil in the particle size class of less than 0.15 mm (fine soil) was removed, the other gravel and coarse soil were sealed together with 500 g zirconia balls (φ300 mm) in a pot mill, and a five-minute milling process was carried out on a turn table (rotation speed 45 rpm). Then, dry classification was carried out to a product of the milling by using sieves with 2 mm and 0.15 mm openings to classify the mixture into soil in a particle size class of 2 mm or more (gravel), soil in a particle size class of less than 2 mm to 0.15 mm (coarse soil), and soil in a particle size class of less than 0.15 mm (fine soil), and ratios of the soils in the respective particle size classes and their lead contents were measured. The ratio of the soil in the particle size class of 2 mm or more (gravel) was 49.9 mass % (lead content 0 mg/kg), the soil in the particle size class of less than 2 mm to 0.15 mm (coarse soil) was 25.0 mass % (lead content 378 mg/kg), and the ratio of the soil in the particle size class of less than 0.15 mm (fine soil) was 8.1 mass % (lead content 562 mg/kg).

Then, dry magnetic separation was carried out to the coarse soil (particle size class of less than 2 mm to 0.15 mm) classified by the dry classification, by using a 7000 gauss magnet. This dry magnetic separation separated the soil into 3.3 mass % (lead content 1480 mg/kg) magnetically attracted matter and 21.7 mass % (lead content 210 mg/kg) magnetically unattracted matter.

From the results of the example 2, it has been confirmed that by introducing the dry milling process, it is possible to efficiently exfoliate the fine soil adhering to surfaces of the gravel and the coarse soil. It was possible to collect thus exfoliated fine soil by the dry classification. Therefore, introducing the dry milling process makes it possible to improve separation accuracy into the gravel, the coarse soil, and the fine soil. Further, when a washing step of the gravel and the coarse soil is provided, it is possible to further alleviate the load of the water disposal. Further, it has been confirmed that by the dry magnetic separation, it is possible to efficiently separate the contaminant also from the coarse soil having undergone the milling process.

Example 3

Figure 3:
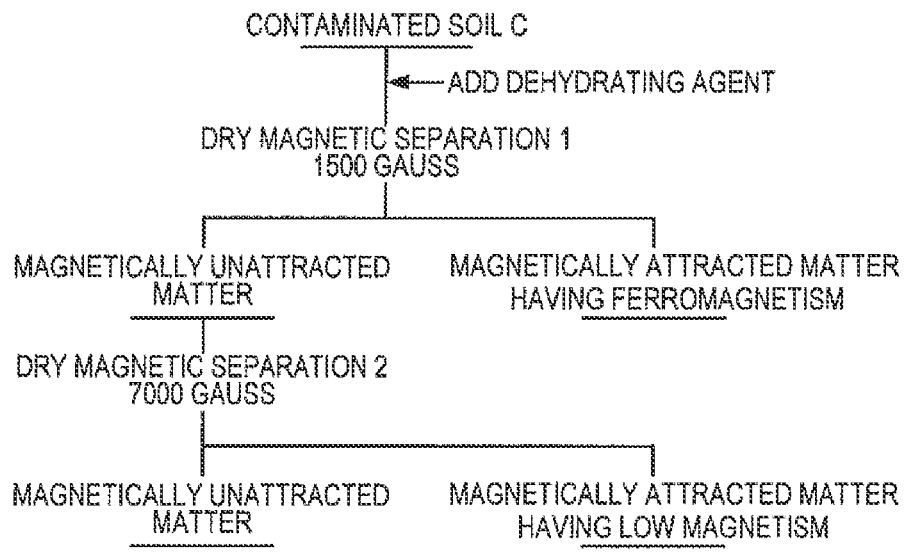
[FIG. 3] is an explanatory process chart of an example 3.

As shown in FIG. 3, by using a magnet with a low magnetic force (1500 gauss), a first dry magnetic separation step was carried out first to soil C (soil multiply contaminated by chromium, arsenic, and fluorine) which was brought into a dry state with a 8.9 mass % water content reduced from the soil original water content of 12.1 mass % by adding 20 mass % gypsum in soil weight ratio, thereby separating the soil C into magnetically attracted matter having ferromagnetism and magnetically unattracted matter. Next, a second dry magnetic separation step was carried out to the magnetically unattracted matter separated by the first dry magnetic separation step, by using a magnet with a high magnetic force (7000 gauss), to separate it into magnetically attracted matter having a low magnetism and magnetically unattracted matter. Weight distributions of the magnetically attracted matter and the magnetically unattracted matter separated by the respective dry magnetic separation steps, and the contents and distribution ratios of chromium, arsenic, and fluorine therein were measured. The results are shown in Table 1.

TABLE 1

| | weight distribution | content mg/kg | | | distribution ratio % | | |
|---|---|---|---|---|---|---|---|
| | mass % | Cr | As | F | Cr | As | F |
| soil C | 100.0 | 2123 | 2 | 486 | 100.0 | — | 100.0 |
| 1500 gauss magnetically attracted matter | 11.9 | 8840 | 6 | 2390 | 49.7 | — | 58.7 |
| 00/7000 gauss magnetically attracted matter | 15.0 | 5230 | 1 | 510 | 37.0 | — | 15.8 |
| magnetically unattracted matter | 73.0 | 385 | <1 | 170 | 13.2 | — | 25.5 |

From the results of the example 3, it is seen that applying the dry magnetic separation process to the soil C in the dry state makes it possible to suitably separate and collect various heavy metals as the magnetically attracted matter. Further, when the first dry magnetic separation step is carried out with a low magnetic force and next the second dry magnetic separation step is carried out with a high magnetic force to the magnetically unattracted matter separated in the first dry magnetic separation step as in the example 3, high separation ability of the contaminants (chromium 87%, fluorine 75%) was exhibited by further performing the second dry magnetic separation step after removing the magnetically attracted matter having the ferromagnetism in the first dry magnetic separation step. This is because an amount of the magnetically unattracted matter mixed in the collection process of the magnetically attracted matter can be reduced.

Example 4

Figure 4:
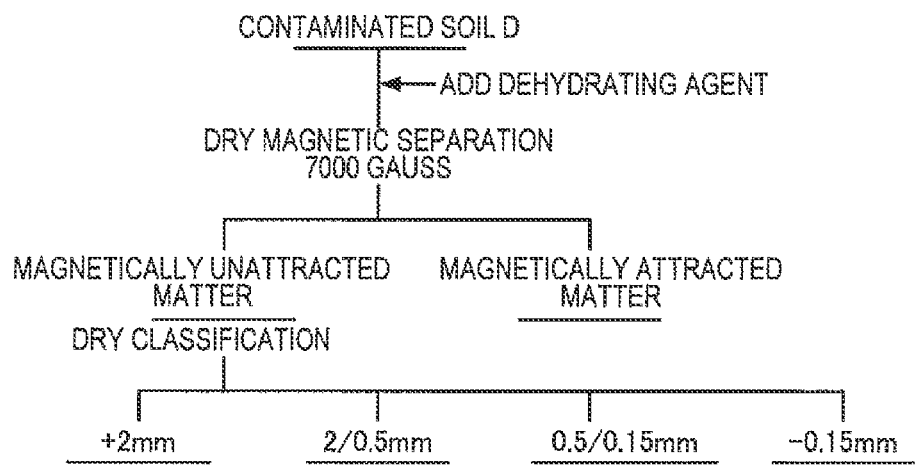
[FIG. 4] is an explanatory process chart of an example 4.

As shown in FIG. 4, 9 mass % quicklime in soil weight ratio was added to soil D multiply contaminated by lead, arsenic, and oil to reduce its water content to 6.4 mass % from 14.3 mass % which is an original soil water content, thereby bringing the soil D into a dry state. Next, a dry magnetic separation step was carried out by using a magnet with a 7000 gauss magnetic force to separate the soil D into magnetically attracted matter and magnetically unattracted matter. Then, dry classification was carried out to the magnetically unattracted matter by using sieves with 2 mm, 0.5 mm, and 0.15 mm openings. The dry classification classified the magnetically unattracted matter into soil in a particle size class of 2 mm or more (gravel), soil in a particle size class of less than 2 mm to 0 5 mm (coarse soil), soil in a particle size class of less than 0.5 mm to 0.15 mm (coarse soil), and soil in a particle size class of less than 0.15 mm (fine soil), and weight distributions of the soils in the respective particle size classes, and the contents and distribution ratios of lead, arsenic, and oil (TPH) therein were measured. The results are shown in Table 2.

TABLE 2

| | weight distribution | content mg/kg | | | distribution ratio % | | |
|---|---|---|---|---|---|---|---|
| | mass % | Pb | As | TPH | Pb | As | TPH |
| soil D | 100.0 | 718 | 566 | 1041 | 100.0 | 100.0 | 100.0 |
| 2 mm/ 0.5 mm | 31.7 | 219 | 99 | 310 | 9.7 | 5.5 | 9.4 |
| 0.5/0.15 mm | 24.1 | 539 | 311 | 670 | 18.1 | 13.2 | 15.5 |
| −0.15 mm | 25.3 | 664 | 554 | 2,780 | 23.4 | 24.8 | 67.6 |
| magnetically attracted matter | 18.9 | 1855 | 1689 | 410 | 48.8 | 56.4 | 7.4 |

From the results of the example 4, it has been confirmed that the soil D multiply contaminated by lead, arsenic, and oil can also be cleaned as in the examples 1 to 3. The present invention is also applicable to multiply contaminated soil.

Example 5

Figure 5:
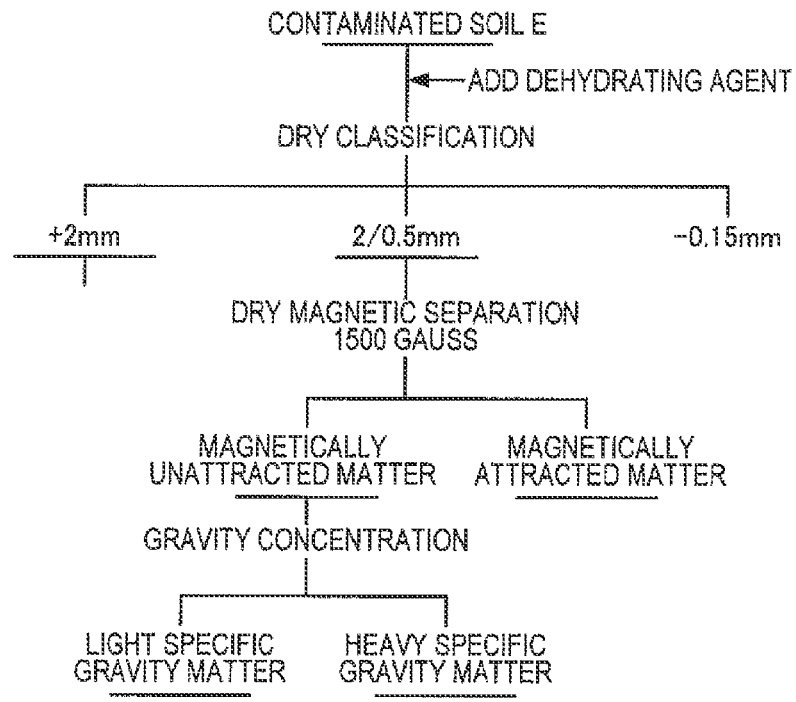
[FIG. 5] is an explanatory process chart of an example 5.

As shown in FIG. 5, 7 mass % quicklime in soil weight ratio was added to soil E contaminated by lead, arsenic, zinc, and copper to reduce its water content to 8.7 mass % from 15.5 mass % which is an original soil water content, thereby bringing the soil E into a dry state. Then, dry classification was carried out by using sieves with 2 mm and 0.15 mm openings to classify the soil E into soil in a particle size class of 2 mm or more (gravel), soil in a particle size class of less than 2 mm to 0.15 mm (coarse soil), and soil in a particle size class of less than 0.15 mm (fine soil).

Next, dry magnetic separation was carried out to the soil in the particle size class of less than 2 mm to 0.15 mm (coarse soil) by using a 1500 gauss magnet to separate the soil into magnetically attracted matter and magnetically unattracted matter. Then, a gravity concentration process was carried out to the magnetically unattracted matter by using a wind-powered separator to separate it into light specific gravity matter and heavy specific gravity matter. Weight distributions of the magnetically attracted matter separated by the dry magnetic separation process and the light specific gravity matter and the heavy specific gravity matter separated by the gravity concentration process, and the contents and distribution ratios of lead, arsenic, zinc, and cupper therein were measured. The results are shown in Table 3.

metal elements (Cu, Zn, and so on) contained in the soil together with the contaminants.

Example 6

Figure 6:
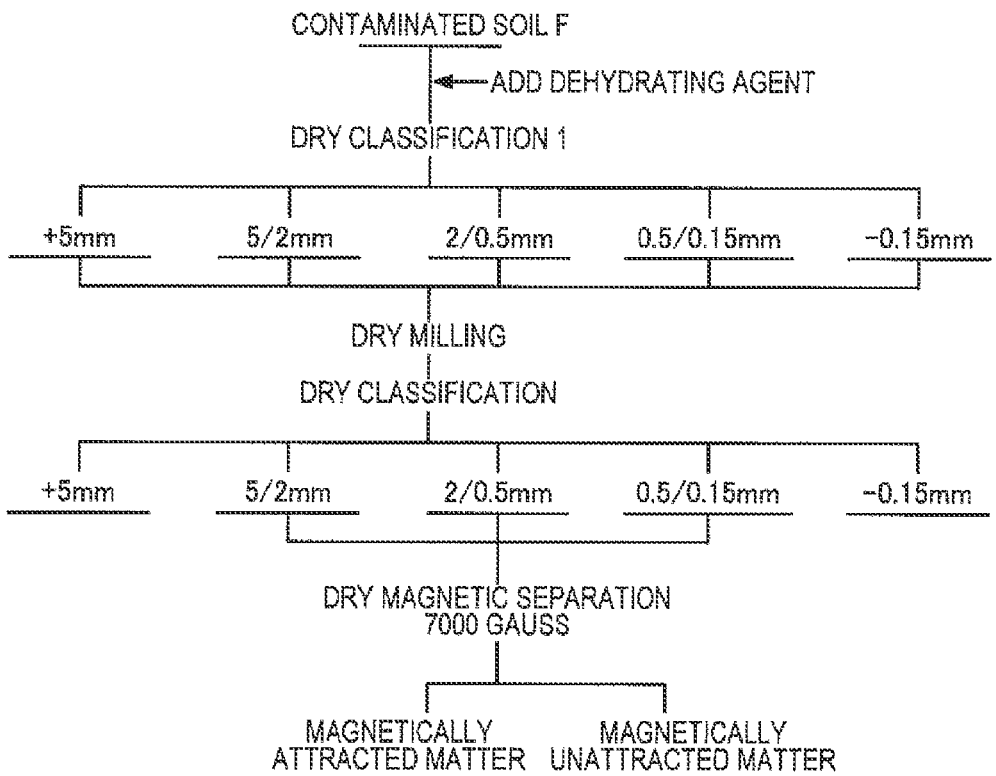
[FIG. 6] is an explanatory process chart of an example 6.

A test was conducted in order to compare accuracy of dry classification and separation accuracy of dry magnetic separation depending on a difference in an addition amount of a dehydrating agent. Quicklime was used as the dehydrating agent, it was added in 6 levels of 0, 2 4, 8, and 12 mass % in soil weight ratio to contaminated soil F, and the comparison test was conducted. As shown in FIG. 6, after the dehydrating agent was added (in 0 mass %, it was not added), a first dry classification step was carried out by using sieves with 5 mm, 2 mm, 0.5 mm, and 0.15 mm openings. Weight distributions after the first dry classification step are shown in Table 4.

TABLE 4

|  | addition ratio of dehydrating agent | water content mass % | classification range | | | | |
| --- | --- | --- | --- | --- | --- | --- | --- |
|  |  |  | +5 mm | 5/2 mm | 2/0.5 mm | 0.5/0.15 mm | −0.15 mm |
| comparative example | 0% | 13.9% | 77% | 21% | 3% | 0% | 0% |
|  | 2% | 12.4% | 52% | 31% | 14% | 2% | 0% |
|  | 4% | 10.5% | 40% | 30% | 23% | 6% | 0% |
| example 6 | 8% | 9.7% | 33% | 30% | 24% | 10% | 4% |
|  | 12% | 8.5% | 23% | 26% | 28% | 14% | 9% |
|  | 20% | 7.2% | 28% | 28% | 24% | 9% | 11% |

After the first dry classification step, the classified soils were mixed again, and the mixture of the soils was sealed in a pot mill together with 500 g zirconia balls (ϕ300 mm), and a five-minute dry milling process was carried out on a turn table (rotation speed 45 rpm).

After the dry milling process, a second dry classification step was carried out by using sieves with 5 mm, 2 mm, 0.5 mm, and 0.15 mm openings to classify the soil into soil in a particle size class of 5 mm or more (gravel), soil in a particle size class of less than 5 mm to 2 mm (gravel), soil in a particle size class of less than 2 mm to 0.5 mm (coarse

TABLE 3

|  |  | content mg/kg | | | | distribution ratio % | | | |
| --- | --- | --- | --- | --- | --- | --- | --- | --- | --- |
|  | mass % | As | Pb | Zn | Cu | As | Pb | Zn | Cu |
| magnetically attracted matter | 5.9 | 584 | 1900 | 4000 | 4250 | 76.6 | 52.6 | 40.8 | 72.3 |
| magnetically unattracted matter (heavy specific gravity) | 1.2 | 188 | 48500 | 91500 | 1800 | 4.8 | 26.2 | 18.2 | 6.0 |
| magnetically unattracted matter (light specific gravity) | 92.9 | 9 | 486 | 2550 | 81 | 18.6 | 21.2 | 41.0 | 21.7 |
| magnetically unattracted matter Total | 94.1 | 11 | 1074 | 3639 | 102 | 23.4 | 47.4 | 59.2 | 27.7 |
| Total | 100.0 | 45 | 2133 | 5787 | 347 | 100.0 | 100.0 | 100.0 | 100.0 |

From the results of the example 5, it has been confirmed that combining the gravity concentration process makes it possible to further effectively separate the contaminants. Incidentally, it has been confirmed that the magnetic separation and the gravity concentration can separate also other soil), soil in a particle size class of less than 0.5 mm to 0.15 mm (coarse soil), and soil in a particle size class of less than 0.15 mm (fine soil), and weight distributions of the soils in the respective particle size classes were measured. The results are shown in Table 5.

TABLE 5

(after milling)

| | addition ratio of dehydrating agent | water content mass % | classification range | | | | |
|---|---|---|---|---|---|---|---|
| | | | +5 mm | 5/2 mm | 2/0.5 mm | 0.5/0.15 mm | −0.15 mm |
| comparative example | 0% | 13.9% | 49% | 34% | 15% | 2% | 0% |
| | 2% | 12.4% | 31% | 28% | 31% | 7% | 1.8% |
| | 4% | 10.5% | 29% | 26% | 27% | 15% | 2.6% |
| example 6 | 8% | 9.7% | 26% | 21% | 24% | 19% | 10% |
| | 12% | 8.5% | 19% | 23% | 27% | 18% | 13% |
| | 20% | 7.2% | 22% | 22% | 22% | 15% | 18% |

Further, dry magnetic separation was carried out to the soil in the particle size class of less than 5 mm to 0.15 mm (gravel and coarse soil) by using a 7000 gauss magnet to separate the soil into magnetically attracted matter and magnetically unattracted matter, and their weight distributions and their lead contents and distribution ratios were measured. The results are shown in Table 6.

TABLE 6

(after magnetic separation)

| | addition ratio of dehydrating agent | water content mass % | weight distribution mass % | | Pb mg/kg | | distribution ratio mass % | |
|---|---|---|---|---|---|---|---|---|
| | | | magnetically attracted matter | magnetically unattracted matter | magnetically attracted matter | magnetically unattracted matter | magnetically attracted matter | magnetically unattracted matter |
| comparative example | 0% | 13.9% | 3.8 | 96.2 | — | — | — | — |
| | 2% | 12.4% | 17.7 | 82.3 | 779 | 758 | 18.1 | 81.9 |
| | 4% | 10.5% | 23.9 | 76.1 | 921 | 765 | 27.5 | 72.5 |
| example 6 | 8% | 9.7% | 26.2 | 63.8 | 1,020 | 550 | 43.2 | 56.8 |
| | 12% | 8.5% | 25.7 | 66.3 | 1,210 | 440 | 51.5 | 48.5 |
| | 20% | 7.2% | 36.3 | 63.7 | 1,100 | 500 | 55.6 | 44.4 |

As shown in Table 6, improvement in lead separation efficiency was confirmed in accordance with a reduction in the water content. On the other hand, when the dehydrating agent was not added, the magnetically attracted matter could not be collected. This is thought to be because the soil is not disintegrated and forms an aggregate. When the addition amount of the dehydrating agent was less than 5 mass % in soil weight ratio and the water content was over 10 mass %, the magnetically attracted matter could be collected since the soil was in a disintegrated state, but the result of lead separation accuracy was lower as compared with the soil in the dry state with the water content of 10 mass % or less. A possible reason for this may be because a mixture amount of the magnetically unattracted matter is large. From the above results, it has been determined that preferably, the addition amount of the dehydrating agent is 5 mass % or more in soil weight ratio and the water content is 10% or less in the present invention.

INDUSTRIAL APPLICABILITY

The present invention is widely used as a technique to clean contaminated soil. The present invention is applied also to soil multiply contaminated by oil and heavy metals as an economical cleaning technique.

What is claimed is:
1. A soil cleaning method, comprising:
   pre-treatment steps of:
      mixing a dehydrating agent in a soil, and
      reducing a water content of the soil to 10 mass % or less;
   a dry classification step of:
      classifying the soil whose water content is 10 mass % or less into one of a gravel, a coarse soil, or a fine soil, wherein a classification point between the gravel and the coarse soil is 2 mm, and a classification point between the coarse soil and the fine soil is 75 µm to 150 µm; and
   magnetic separation steps of:
      feeding the soil whose water content is 10 mass % or less to a dry magnetic separator; and
      separating and removing a contaminant in the coarse soil and the fine soil as magnetically attracted matter using the dry magnetic separator, wherein
   the contaminant is selected from the group consisting of chromium, arsenic, fluorine, zinc, copper and oil.
2. The soil cleaning method according to claim 1, further comprising the step of:
   milling the soil after the pre-treatment steps or the magnetic separation steps.
3. The soil cleaning method according to claim 1, further comprising the step of:
   performing a gravity concentration process after the pre-treatment steps or the magnetic separation steps.
4. The soil cleaning method according to claim 1:
   wherein the magnetic separation step comprises:
   separating the contaminant using a magnet having a first magnetic force from a magnetically unattracted matter, and
   separating a low magnetically attracted contaminant using a magnet with a second magnetic force that is higher than the first magnetic force from the magnetically unattracted matter.
5. The soil cleaning method according claim 1, wherein as the dehydrating agent, one of quicklime, gypsum, and cement is used.
6. The soil cleaning method according claim 1, wherein the magnetic separation step comprises:
   separating a magnetically attracted matter having ferromagnetism from a magnetically unattracted matter using a first magnetic force, and separating a low magnetically attracted matter having low ferromagnetism from the magnetically unattracted matter using a second magnetic force that is higher than the first magnetic force.

7. The soil cleaning method according to claim 1, wherein the dehydrating agent in the pre-treatment process is between 10% and 20% of the soil in weight ratio.

* * * * *